United States Patent [19]

Kaminski et al.

[11] Patent Number: 4,667,125

[45] Date of Patent: May 19, 1987

[54] ROTOR SLOT INSULATION SYSTEM FOR ELECTRICAL MACHINE AND ARTICLE INCORPORATING SAME

[75] Inventors: Christopher A. Kaminski, Schenectady; Paul C. Rasmussen, Schaghticoke, both of N.Y.

[73] Assignee: General Electric Company, Schenectady, N.Y.

[21] Appl. No.: 791,238

[22] Filed: Oct. 25, 1985

[51] Int. Cl.$^4$ .............................................. H02K 3/48
[52] U.S. Cl. .................................. 310/214; 310/215; 310/261
[58] Field of Search ........................ 310/214, 215, 261

[56] References Cited

U.S. PATENT DOCUMENTS

| | | | |
|---|---|---|---|
| 1,555,065 | 9/1925 | Lindquist | 310/214 |
| 3,243,622 | 3/1966 | Whittlesey | 310/214 |
| 3,393,335 | 7/1968 | Pletenik et al. | 310/214 |
| 3,594,597 | 7/1971 | Kildishev | 310/214 |
| 4,333,022 | 6/1982 | Madsen | 310/214 X |
| 4,473,765 | 9/1984 | Butman, Jr. et al. | 310/215 |

*Primary Examiner*—Donovan F. Duggan
*Attorney, Agent, or Firm*—Jerome C. Squillaro

[57] ABSTRACT

A rotor slot insulation system includes two L-shaped insulative armors lining a slot that is disposed in the rotor for receving a conductor. The short legs of the insulative armors, which are disposed at the bottom of the slot, face each other and preferably abut. A spacer device overlays the short legs for spacing the conductor away from the corners of the armors and for increasing the electrical path from the conductor to the rotor. The spacer device and insulative armors may be secured by disposing a member, which is affixed to the spacer device, to engage the short legs of the insulative armors and to extend into a recess in the bottom of the slot. In a more preferred embodiment, the spacer device and insulative armors are extended beyond each axial end of the rotor body and a respective member is affixed to the spacer device beyond each axial end of the rotor body and radially inwardly extends to engage the respective axial end of the rotor body or a centrally disposed spindle for preventing axial motion of the spacer device and the insulative armors in the slot.

2 Claims, 2 Drawing Figures

ROTOR SLOT INSULATION SYSTEM FOR ELECTRICAL MACHINE AND ARTICLE INCORPORATING SAME

BACKGROUND OF THE INVENTION

The invention relates to a rotor slot insulation system for an electrical machine and to an article incorporating same and, more particularly, to a rotor slot insulation system wherein the insulation is inhibited from undesirable axial movement while being protected from potential compromise of the insulative integrity at the bottom corners of the slot due to concentrated load applied at the corners by the edge of a conductor to be disposed within the slot. This invention may be beneficially employed in any electrical machine having a rotor in which slots are disposed for receiving an electrical conductor and wherein the electrical conductor must be insulated from the material constituting the body of the rotor. It may be especially beneficially employed in an electric generator, or dynamoelectric machine having a rating greater than about 3000 KW, wherein the electrical conductor lying in the axial extending slot of the rotor body constitutes a field winding and further wherein the rotor is typically centrally disposed within a stationary circumferentially surrounding stator or armature winding.

Ground insulation, or slot armor, which is disposed in coil slots of a rotor for insulating conductors to be disposed in the slots from the body of the rotor, must be prevented from axially migrating out an end of the rotor slot. Such migration may create one or more grounds on the conductor wherein subsequent current flow through the ground path may damage the rotor body and results in a reduction in efficiency. Such migration may also create a thermal imbalance and produce undesirable rotor vibration. Such migration is caused, in part, by thermal cycling in response to changes in current necessary to accommodate varying output power demanded from, or input to the machine.

Historically, ground insulation coil slots was made from a relatively compliant material formed into a U-shaped channel into which coils were wound with essentially zero side clearances. After the coil was wound, the two radially protruding sides of the insulation were folded over. Any remaining space in the slot between the top of the coil and a rotor wedge was packed with a filler material. During operation, outward centrifugal force exerted by the coil conductors against the rotor wedges was sufficient to secure the ground insulation against axial motion. Thus no creepage or spacer strip was required at the bottom of the slot for securing the ground insulation against undesirable axial motion within the slot.

The relatively compliant material that was formed into a U-shaped channel has subsequently been replaced in many applications by materials having superior mechanical qualities. However, these latter materials are generally less pliable and are therefore typically preformed as L-shaped pieces. Opposing horizontal legs (typically the shorter legs) of L-shaped pieces are butted together at the bottom of the coil slot to form the substantially U-shaped insulation of the earlier designs. However, this butt joint creates a very short electrical creepage path to ground potential across the thickness of the insulation and thus it is necessary to provide a larger creepage path, such as by inserting a strip of electrically insulative material, known as a creepage strip, along the bottom (radially innermost position) of the coil slot between the rotor body and the horizontal legs of the L-shaped pieces.

In one configuration which has been used to secure the L-shaped insulation within the slot, the L-shaped insulation is extended beyond an axial end of the rotor body and wedges are applied between adjacent slots to force the vertical leg (typically the longer leg) of one L-shaped member of each adjacent slot into the side of the conductors within the respective slot of the leg, so that frictional forces secure the respective L-shaped pieces against axial movement. However, in a certain classes of rotors, a cooling channel axially extends between adjacent slots from the axial end of the rotor body. In such cases, the block for wedging the L-shaped insulation may interfere with coolant fluid flow into the cooling channel. Wedges having an opening through them have been used to allow cooling fluid to pass therethrough and onto the cooling channel. Such wedges cannot be fitted as well, and do not provide the same level of restraint against axial movement of the slot insulation, as do solid wedges. Besides securing the L-shaped insulation pieces within the slot, it is also necessary to secure the creepage strip against undesirable axial motion, which has been accomplished by fixedly attaching a radially inwardly extending button to the creepage strip and mating it with a cooperating recess, fabricated, such as by drilling, into the bottom of the coil slot.

In addition, in order to be accommodated within the coil slot without compromising the insulative quality of the L-shaped pieces, the radially innermost conductor in the slot must have generously radiused edges to coincide with the inside radius of the junction of the vertical and horizontal legs of the L-shaped insulation. Without this radius, the relatively sharp, squared-off edges of the radially innermost conductor exert a concentrated load against the slot insulation, which may cause it to crack, thereby compromising the insulative integrity of the L-shaped insulation. However, from an efficiency standpoint, it is generally desirable to provide the maximum amount of conductor material, e.g. copper, and therefore radiusing edges of a typically rectangular conductor should be avoided. Also, radiusing requires additional fabrication steps, which necessitate additional handling and expense.

Accordingly, it is an object of the present invention to secure rotor slot insulation against undesirable axial movement without intefering with coolant gas flow.

Another object of the present invention is to prevent compromising the insulative integrity of slot insulation from unradiused conductors lying within the slot.

Yet another object of the present invention is to eliminate fabrication and machining steps required to provide recesses in the bottom of the rotor slot for receiving buttons for securing the creepage strip.

Still another object of the present invention is to eliminate fabrication of radiused edges in conductors to be disposed in the slot.

SUMMARY OF THE INVENTION

In accordance with the present invention, an insulation system for a generally axially extending slot disposed in the body of a rotor of an electrical machine, the slot for receiving at least one electrical conductor and having a bottom at a radial inner portion of the body and opposing spaced apart sides intersecting the bottom, comprises electrical insulation means lining at least a portion of the sides and bottom of the slot for electrically insulating the at least one electrical conductor from the body of the rotor, spacer means, such as a creepage strip, disposed within the slot and radially outwardly overlaying the electrical insulation means at the bottom of the slot for spacing the at least one electrical conductor from the insulation means at the bottom of the slot and locking means coupled to the spacer means for preventing axial motion of the spacer means and the electrical insulation means within the slot.

The insulation means may include a pair of L-shaped members disposed within the slot such that the short legs oppose and preferably abut each other. The insulation means and spacer means may be prevented from undesirable axial motion by a member, which is fixedly secured to the spacer means and radially inwardly extends into retaining means, such as a recess, in the bottom of the slot, wherein the member also matingly engages the insulation means. The radial inner edges of the creepage strip may be contoured complementary to the inside corners of the L-shaped members.

In a more preferred embodiment, the spacer means and insulation means are extended beyond each axial end of the rotor body and a respective securing member, which is fixedly attached to the spacer means beyond each end of the rotor body, radially inwardly extends to engage the respective end of the rotor body, or a centrally disposed spindle, for preventing axial motion of the spacer means and the insulation means.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 1 is also a view looking in the direction of the arrows of line 1—1 of FIG. 2.

DETAILED DESCRIPTION

Figure 1:
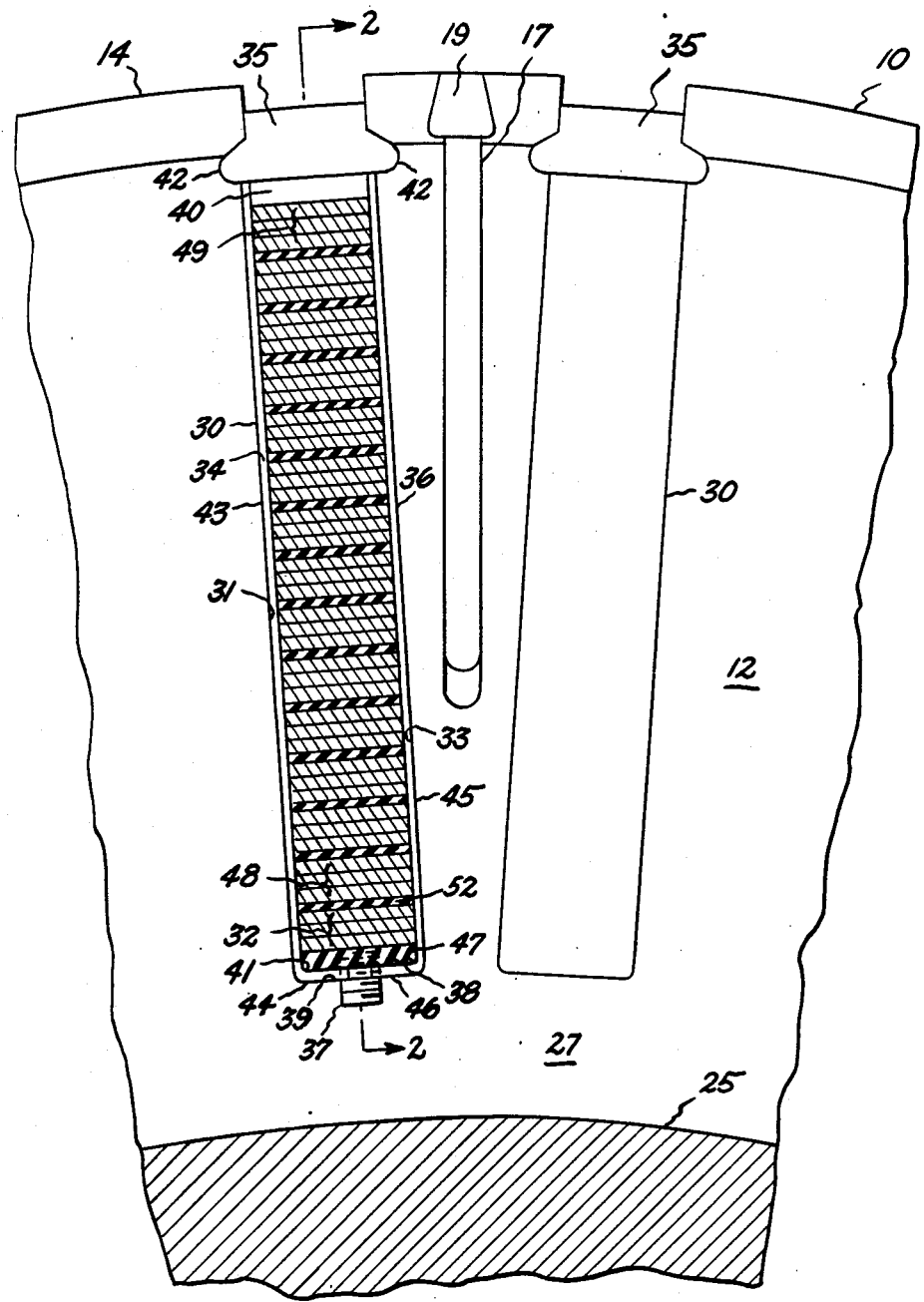
FIG. 1 is an axial view of a rotor including an insulation system in accordance with the present invention.

Referring to FIG. 1, an axial view of a rotor 10 including an insulation system in accordance with the present invention is shown. Rotor 10 comprises a generally cylindrical rotor body 14 having at least a pair of axially lying slots 30 extending inward from the periphery of rotor body 14 for accommodating a coil, or winding, 32 of electrically conductive material, such as copper, and generally centrally disposed and axially extending spindle 25 coupled to and rotatable with rotor body 14. Winding 32 comprises at least one electrical conductor of which three are shown. In large machines, slots 30 may extend generally parallel to the axis of the rotor for 20 or 30 feet and customarily extend in an axial direction from one axial end 12 of rotor body 14 to the other (not shown). In certain classes of rotor 10, a vent slot 17, disposed between adjacent slots 30, radially extends into, and may extend the full length of, rotor body 14 from axial end 12 of rotor body 14. Typically disposed at the radial outer portion of vent slot 17 is a vent slot wedge 19 having axially spaced fluid communication means, or holes, (not shown) for permitting coolant fluid for cooling rotor 10, which has entered the axial end of vent slot 17, to radially outwardly exit axially along the outer periphery of rotor body 14.

A pair of generally L-shaped insulating slot armor, or insulation, elements 34 and 36 line sides 31 and 33 of slot 30, which intersect bottom 39 of slot 30, continuously along the full length of slot 30 with short arms, or horizontal legs, 44 and 46 facing or opposing each other, and preferably abutting. Overlaying legs 44 and 46 of slot armor 34 and 36 is spacer means, such as a creepage strip, 38 extending along the full length of slot 30. The radial inner edges 41 and 47 of spacer means 38 may be contoured complementary to the inside corners of armor elements 34 and 36, respectively, for mating engagement therewith and for reducing the amount of non-conductive material within slot 30. Spacer means 38 may comprise an electrically non-conductive material, such as an epoxy-glass resin composite. A first winding, or conductor, 32 rests in the bottom of the cavity formed by slot armor elements 34 and 36. An insulating layer 52 is interposed between winding 32 and a next radially outer winding 48, which comprises at least one electrical conductor. Insulating layer 52 may be of any convenient material such as, for example, a conventional polyester glass insulation. The remainder of slot 30 is filled with alternating windings and insulating layers to a last or radially outermost winding 49. Finally, a creepage block 40, comprising a glass fiber matrix in a cured resin binder, covers the top of slot 30 above radially outermost winding 49. A machined metal slot wedge 35 is inserted into axially extending dovetails 42 in the sides of slot 30 to hold the aforementioned parts in place against the large centrifugal force they experience during rotation of rotor 10. Slot armor 34 and 36 is conventional and may comprise, for example, a fabric laid up from woven or non-woven glass fibers impregnated with a resin and cured by conventional means. Because such slot armor elements 34 and 36 are relatively rigid, inside corners 41 and 47 at the junction of horizontal, or short, legs 44 and 46 with the respective vertical, or long, legs 43 and 45 of L-shaped insulating members 34 and 36 are generally rounded and do not obtain a squared-off or sharp appearance.

It is preferred that winding 32 have a generally rectangular axial profile so that a maximum amount of conductive material can be carried thereby. The lower, or radially inner, edges of conductor 32 are thus formed by relatively sharp corners which may abraid and eventually cut the inside corners of L-shaped armor 34 and/or 36 if winding 32 were to be disposed directly overlaying legs 44 and 46. Further, it is not desirable to round off the lower edges of winding 32 to accommodate rounded corners 41 and 47 of insulation 34 and 36, respectively, since such rounding would remove a portion of the conductive material of winding 32 and would also entail additional fabrication steps. Thus, in accordance with the present invention, slot armor 34 and 36 are disposed in slot 30 such that legs 44 and 46 overlay bottom 39 of slot 30. Spacer means 38 is disposed in the cavity formed by slot armor 34 and 36 and directly overlays legs 44 and 46. Spacer means 38 is appropriately sized so that when winding 32 is disposed in the cavity formed by insulation 34 and 36, winding 32 is spaced from legs 44 and 46 and from corners 41 and 42 of insulation 34 and 36, respectively, by spacer means 38 such that the lower edges of winding 32 do not contact, and therefore avoid damaging, insulation 34 and 36 at respective corners 41 and 47 thereof. Further, the electrical creepage path, which includes the space between opposing legs 44 and 46 (since even if legs 44 and 46 abut, the insulative capacity thereof is not as great as an uninterrupted insulator of the same size and material) has been lengthened by disposing spacer means 38 between winding 32 and bottom 39 of slot 30.

Figure 2:
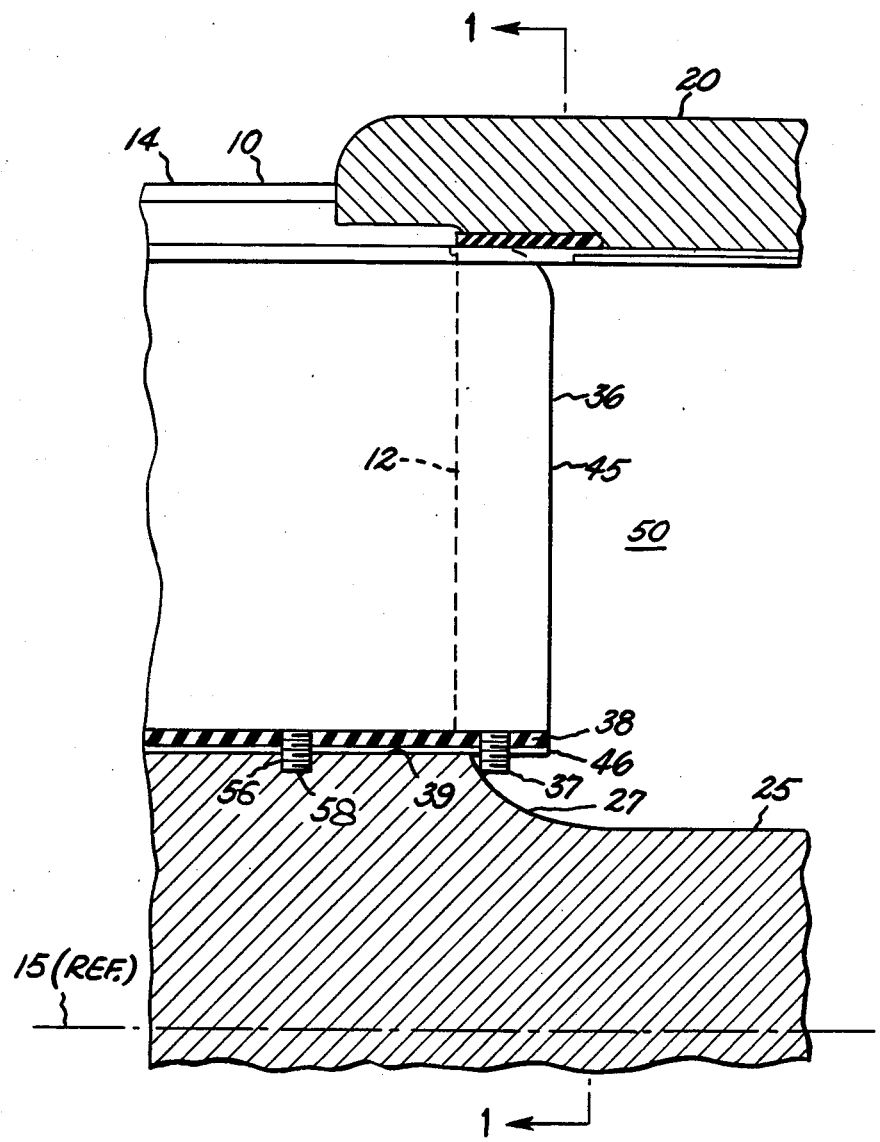
FIG. 2 is a view looking in the direction of the arrows of line 2—2 of FIG. 1 with the conductors of the coil and the retaining ring removed for clarity.

It is also necessary to secure spacer means 38 and slot armor 34 and 36 within slot 30 for preventing axial migration of spacer means 38 and/or slot armor 34 and 36 within slot 30. Referring to FIG. 2, a view looking in the direction of the arrows of line 2—2 of FIG. 1 is shown. Generally circumferentially surrounding end turn region 50, which is disposed beyond axial end 12 of rotor body 14 is a retaining ring 20. Locking means for securing slot armor 34 and 36 in slot 30 comprises a member 56 fixedly coupled to or integral with spacer means 38 and extending through bottom 39 of slot 30 into an appropriate cooperating retaining means, such as a hole or recess, 58 in rotor body 14, while matingly engaging (such as by passing through cutouts in legs 44 and 46 that partially surround member 50 and are appropriately contoured to be complementary to the periphery of member 50 for preventing axial motion of spacer means 38 and slot armor 34 and 36 within slot 30. Member 50 may be at least a partially threaded dowel which threadingly mates with a cooperating recess or hole in spacer means 38.

In a more preferred means for securing spacer means 38 and slot armor 34 and 36 against undesirable axial migration thereof, slot armor 34 and 36 and spacer means 38 are axially extended beyond end 12 of rotor body 14. Locking means including a member, 37, such as an at least partially threaded dowel, is fixedly coupled to, such as by threadingly mating with a cooperating recess or hole in spacer means 38, or is integral with spacer means 38 and generally radially inwardly extends beyond legs 44 and 46. Member 37 also matingly engages legs 44 and 46 analogously to member 50. Should undesirable axial motion of spacer means 38 and/or slot armor 34 and 36 occur, say to the left in FIG. 2, then radially inwardly extending member 37 contacts or abuts against the periphery of spindle 25 at the outwardly radially extending portion 27 thereof. Depending on the configuration of spindle 25 and the extent of radially outward extending portion 27 thereof, member 37 may alternatively abut against axial end 12 of rotor body 14. A similar configuration of slot armor 34 and 36 and spacer means 38 may be used at the other axial end (not shown) of rotor body 14 for preventing undesirable axial motion, say to the right in FIG. 2. Thus by employing locking means 37 at each axial extension of spacer means 38 and slot armor 34 and 36 beyond respective axial ends of rotor body 14, undesirable axial migration of slot armor 34 and 36 and spacer means 38 within slot 30 may be prevented. Also, by disposing member 37 outside the confines of rotor body 14, processing and fabrication of retaining means 58 in bottom 39 of slot 30 is eliminated.

Thus has been illustrated and described a method and means for securing rotor slot insulation against undesirable axial movement while preventing compromising the insulative integrity of slot insulation for unradiused conductors lying within the slot, thereby eliminating steps necessary to fabricate radiused edges in conductors to be disposed in the slot. Further, a method and means for securing rotor slot insulation and spacer means against undesirable axial movement while eliminating steps to fabricate a recess in the bottom of the slot have been shown and described.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. In an electrical machine of the type including a rotor having axially extending slots formed therein extending radially inward form the rotor surface; a plurality of coductors disposed in the slots and electrical insulation between the conductors and the sides and bottom of each of said slots; an improved insulation system wherein the improvement comprises:
    at least one spacer disposed in the bottom of each slot and overlying a bottom portion of said electrical insulation;
    a plurality of holes in said spacer distributed along the axial length of said spacer; and,
    a dowel inserted into each spacer hole and extending through the bottom insulation into a corresponding and aligned hole in said rotor whereby axial movement of the spacer and the insulation is prevented.

2. The improvement insulation system recited in claim 1 wherein each dowel and each corresponding and aligned hole in the rotor is threaded.

* * * * *